US009135769B2

(12) United States Patent
Monti

(10) Patent No.: US 9,135,769 B2
(45) Date of Patent: Sep. 15, 2015

(54) APPARATUS FOR REGULATING RELEASE OF TABLETS INTO CELLS OF A HEAT FORMED STRIP

(71) Applicant: Marchesini Group S.p.A., Pianoro (IT)

(72) Inventor: Giuseppe Monti, Pianoro (IT)

(73) Assignee: Marchesini Group S.P.A., Bologna (IT)

( * ) Notice: Subject to any disclaimer, the term of this patent is extended or adjusted under 35 U.S.C. 154(b) by 226 days.

(21) Appl. No.: 13/710,655

(22) Filed: Dec. 11, 2012

(65) Prior Publication Data

US 2013/0153595 A1 Jun. 20, 2013

(30) Foreign Application Priority Data

Dec. 14, 2011 (IT) .............................. BO2011A0708

(51) Int. Cl.

| | |
|---|---|
| ***B65G 59/00*** | (2006.01) |
| ***B65H 3/00*** | (2006.01) |
| ***B23Q 7/04*** | (2006.01) |
| ***G07F 11/56*** | (2006.01) |
| ***B65B 5/10*** | (2006.01) |
| ***B65B 37/02*** | (2006.01) |

(52) U.S. Cl.

CPC ................ *G07F 11/56* (2013.01); *B65B 5/103* (2013.01); *B65B 37/02* (2013.01)

(58) Field of Classification Search

CPC .......... B65B 36/54; B65B 5/10; B65B 5/103; B65B 35/12; B65B 47/08

USPC ............... 221/30, 258, 210; 206/531; 53/248, 53/246, 559

See application file for complete search history.

(56) References Cited

U.S. PATENT DOCUMENTS

| | | | | |
|---|---|---|---|---|
| 1,383,623 A * | 7/1921 | Groves | ............................ | 53/493 |
| 3,076,649 A * | 2/1963 | Stevenson | ..................... | 271/307 |
| 3,081,588 A * | 3/1963 | Klapes et al. | ................... | 53/501 |
| 3,206,062 A * | 9/1965 | Rappaport | ......................... | 221/7 |
| 3,490,197 A * | 1/1970 | Cremieux | ......................... | 53/55 |
| 3,526,743 A * | 9/1970 | Spisak | ............................ | 219/98 |
| 3,767,089 A * | 10/1973 | McKee et al. | ................. | 222/221 |
| 3,789,575 A * | 2/1974 | Bross | .............................. | 53/534 |

(Continued)

FOREIGN PATENT DOCUMENTS

| | | |
|---|---|---|
| CN | 201472699 U * | 5/2010 |
| EP | 1391386 A2 | 2/2004 |

(Continued)

OTHER PUBLICATIONS

European Search Report for Corresponding application No. EP12196225, completed Feb. 28, 2013, 2 pages.

*Primary Examiner* — Rakesh Kumar

(74) *Attorney, Agent, or Firm* — Ware, Fressola, Maguire & Barber LLP

(57) ABSTRACT

An apparatus for regulating release of tablets into cells of a heat-formed strip has a frame (2), and at least one supply channel (3) for directing tablets (4) to an outlet (5). A tooth (6) is movable between a first position (A) where the tooth blocks the supply channel and a second position (B) which allows transit of the tablets (4) to the outlet. An elastically flexible blade (7) is fixed to the frame (2) and equipped with the tooth (6). A tube (8) supplied with a fluid elastically expands or retracts in a radial direction as a function of the fluid pressure. The tube (8) abuts the flexible blade (7) in such a way that by regulating the pressure of the fluid internally of the tube (8), it is possible to control the position of the tooth (6).

8 Claims, 4 Drawing Sheets

(56) References Cited

U.S. PATENT DOCUMENTS

| | | | | | |
|---|---|---|---|---|---|
| 4,405,661 | A | * | 9/1983 | Alheid | 427/356 |
| 4,495,888 | A | * | 1/1985 | Wohrle et al. | 118/410 |
| 4,674,259 | A | * | 6/1987 | Hills | 53/202 |
| 4,757,782 | A | * | 7/1988 | Pullinen | 118/411 |
| 4,869,933 | A | * | 9/1989 | Sollinger et al. | 427/356 |
| 4,934,310 | A | * | 6/1990 | Wohrle et al. | 118/410 |
| 4,935,310 | A | * | 6/1990 | Nakatsugawa | 428/607 |
| 4,945,855 | A | * | 8/1990 | Eklund et al. | 118/407 |
| 5,109,792 | A | * | 5/1992 | Baldini | 118/410 |
| 5,397,601 | A | * | 3/1995 | Korhonen | 427/361 |
| 5,460,119 | A | * | 10/1995 | Maroszek | 118/244 |
| 5,463,839 | A | * | 11/1995 | Stange et al. | 53/54 |
| 5,737,902 | A | * | 4/1998 | Aylward | 53/475 |
| 5,746,833 | A | * | 5/1998 | Gerhardt | 118/665 |
| 5,902,401 | A | * | 5/1999 | Elvidge et al. | 118/262 |
| 6,497,083 | B1 | * | 12/2002 | Garwood et al. | 53/244 |
| 7,007,821 | B2 | * | 3/2006 | Aylward | 221/289 |
| 7,174,694 | B2 | * | 2/2007 | Ogger et al. | 53/235 |
| 7,523,594 | B2 | * | 4/2009 | Greenwald et al. | 53/255 |
| 7,591,122 | B2 | * | 9/2009 | Monti | 53/246 |
| 7,878,366 | B2 | * | 2/2011 | Cicognani | 221/7 |
| 8,220,657 | B2 | * | 7/2012 | Cicognani | 221/7 |
| 8,225,925 | B2 | * | 7/2012 | Bassani | 198/758 |
| 8,312,834 | B2 | * | 11/2012 | Friske et al. | 118/261 |
| 8,365,507 | B2 | * | 2/2013 | Klingel | 53/493 |
| 8,789,344 | B2 | * | 7/2014 | Monti | 53/319 |
| 8,826,631 | B2 | * | 9/2014 | Singer | 53/255 |
| 2001/0045081 | A1 | * | 11/2001 | Aylward | 53/244 |
| 2002/0108356 | A1 | * | 8/2002 | Aylward | 53/473 |
| 2004/0007442 | A1 | * | 1/2004 | Monti | 198/538 |
| 2004/0139695 | A1 | * | 7/2004 | Monti | 53/264 |
| 2005/0230001 | A1 | * | 10/2005 | Monti | 141/129 |
| 2007/0095716 | A1 | * | 5/2007 | Monti | 206/531 |
| 2008/0156825 | A1 | * | 7/2008 | Monti | 221/210 |
| 2009/0090659 | A1 | * | 4/2009 | Monti | 209/528 |
| 2009/0247380 | A1 | * | 10/2009 | Monti | 493/315 |
| 2012/0094818 | A1 | * | 4/2012 | Monti | 493/314 |
| 2013/0175288 | A1 | * | 7/2013 | Monti | 221/65 |

FOREIGN PATENT DOCUMENTS

| | | | | | |
|---|---|---|---|---|---|
| EP | 2405775 | A1 | * | 1/2012 | |
| JP | 3000618 | A | | 1/1991 | |
| JP | 05085519 | A | * | 4/1993 | B65B 35/54 |
| JP | 5085519 | A | | 4/1993 | |

* cited by examiner

APPARATUS FOR REGULATING RELEASE OF TABLETS INTO CELLS OF A HEAT FORMED STRIP

FIELD OF INVENTION

The present invention relates to the technical field of producing blister packs containing tablets.

In particular, the invention relates to an apparatus for regulating the release of tablets into cells of a heat-formed strip.

DESCRIPTION OF PRIOR ART

A similar apparatus works above a heat-formed strip affording a plurality of cells and which is mobile in an advancement direction. The apparatus regulates the release of the tablets into the cells of the heat-formed strip. Thereafter, the heat-formed strip is sealed and then cut to form blister packs containing the tablets. An apparatus of this type comprises: a frame; a supply channel in which tablets flow in a line towards a relative outlet; a single-acting pneumatic cylinder; a lever which bears a tooth and which is activated by the pneumatic cylinder to reach a first advanced position, in which the tooth obstructs the supply channel so as to interrupt the passage of tablets; a spring interposed between the frame and the lever such as to bring the tooth into a second retracted position, in which passage of tablets is allowed along the supply channel, once the pneumatic cylinder has been deactivated.

As a heat-formed strip usually exhibits more than one longitudinal row of cells, the apparatus comprises a same number of; supply channels of tablets; single-acting pneumatic cylinders; levers; teeth; and springs.

The apparatus is further provided with a protective casing fixed to the frame. However, given that each tooth is mobile between the first advanced position and the second retracted position, a passage is defined between the environment in which components such as levers, springs and cylinders and the corresponding supply channel are contained, and in turn communicates, via the relative outlet, with the outside. A breakage of or damage to a spring, for example for reasons of wear, can produce metal fragments able to infiltrate through one of the passages and fall onto the heat-formed strip, fouling it. A similar event might pass unobserved, at least at first, causing a serious risk to the health of people who will ingest the tablets contained in the blister packs obtained from the heat-formed strip in question.

An operator noticing the breakage of a spring or a mechanical component of the apparatus would have to halt production and trash a quantity of blister packs that is difficult to estimate but which would be high, which would incur considerable economic damage.

SUMMARY OF THE INVENTION

The aim of the present invention consists in obviating the above-cited drawback.

The above-mentioned aim is attained with an apparatus comprising a frame, at least one supply channel which can be crossed by tablets and which comprises an outlet of tablets. A tooth is mobile between a first advanced position, in which the tooth blocks the supply channel so as to interrupt transit of tablets, and a second retracted position for consenting transit of tablets along the supply channel. The apparatus includes an elastically flexible blade which is fixed to the frame and equipped with the tooth, and a tube which can be supplied with a fluid for elastically expanding or retracting the tube in a radial direction as a function of a pressure the fluid attains internally of the tube. The tube is arranged so as to abut the flexible blade in such a way that by regulating the pressure of the fluid internally of the tube, it is possible to command the position the tooth can take on.

The apparatus advantageously does not include the use of springs, which as they wear out can lose metal fragments which might fall onto the heat-formed strip. In the present invention, there is no risk that the mechanical components which operate to move the tooth between the first advanced position and the second retracted position might lose mechanical fragments following wear or breakage thereof. The blade, for example, can at most break into two parts, which does not produce mechanical fragments of dimensions that could fall onto the heat-formed strip. In this case, the broken parts are of such dimensions as to remain imprisoned in the casing which is normally fixed to the frame of the apparatus.

The present invention is particularly suitable, therefore, for use in the production of blister packs containing tablets; still more, the present invention will be advantageously used in a case in which the tablets to be packed in the blister pack are medicinal.

Further, it is specified that the present invention enables moving the tooth at much higher speeds than are possible with the prior art, in which single-acting cylinders, levers and springs are used.

In addition, the invention enables obtaining control of the tooth using components which are smaller in number and volume than the ones used in the prior art. In particular, of particular note is the fact that the use of a single-acting cylinder and a spring is no longer necessary. In fact, these components of the prior art make the apparatus very voluminous, especially when many supply channels are required, as it is necessary to use the same number of pneumatic cylinders, levers and springs.

The apparatus of the present invention is therefore more compact and lighter, which is very advantageous in particular if the apparatus has to be activated in order to perform movements following the advancing heat-formed belt for the purposes of introduction of tablets into the relative cells.

In an embodiment of the invention, the tube is interposed between the supply channel and the blade, such that an expansion of the tube determines flexing of the blade with a consequent displacement of the tooth towards the second retracted position.

In a case in which the fluid is air supplied by a source of compressed air, should the compressed air supply to the tube fail, for example due to a fault, the tooth would occupy the first advancement position, blocking the passage of tablets along the supply channel and thus preventing the tablets from exiting and falling onto the heat-formed strip. This is a safety condition which functions as a precautionary way of blocking release of tablets in the presence of malfunctioning in the supply of the compressed air.

In a further embodiment, the blade is instead interposed between the tube and the supply channel such that an expansion of the tube causes flexing of the blade with a consequent displacement of the tooth towards the first advanced position. In this case, if the fluid is air and if an undesired interruption of the supply of compressed air into the tube occurs, the tooth would occupy the second retracted position, which would enable passage of tablets through the outlet of the supply channel. This drawback could be solved by reserving a separate circuit for supplying compressed air to the tube, i.e. a circuit which would be separate with respect to the other compressed-air circuits of the machine, which separate circuit would be applied to the packing of the blisters with the tablets, of which the present apparatus is an integral part. The advantage of this realization consists in a still greater intervention speed of the tooth of the supply channel thanks to the pneumatic command.

BRIEF DESCRIPTION OF THE DRAWINGS

The specific embodiments of the invention will be described in the following of the present description, according to what is set out in the claims and with the aid of the accompanying tables of drawings, in which:

DESCRIPTION OF PREFERRED EMBODIMENTS

Figure 2:
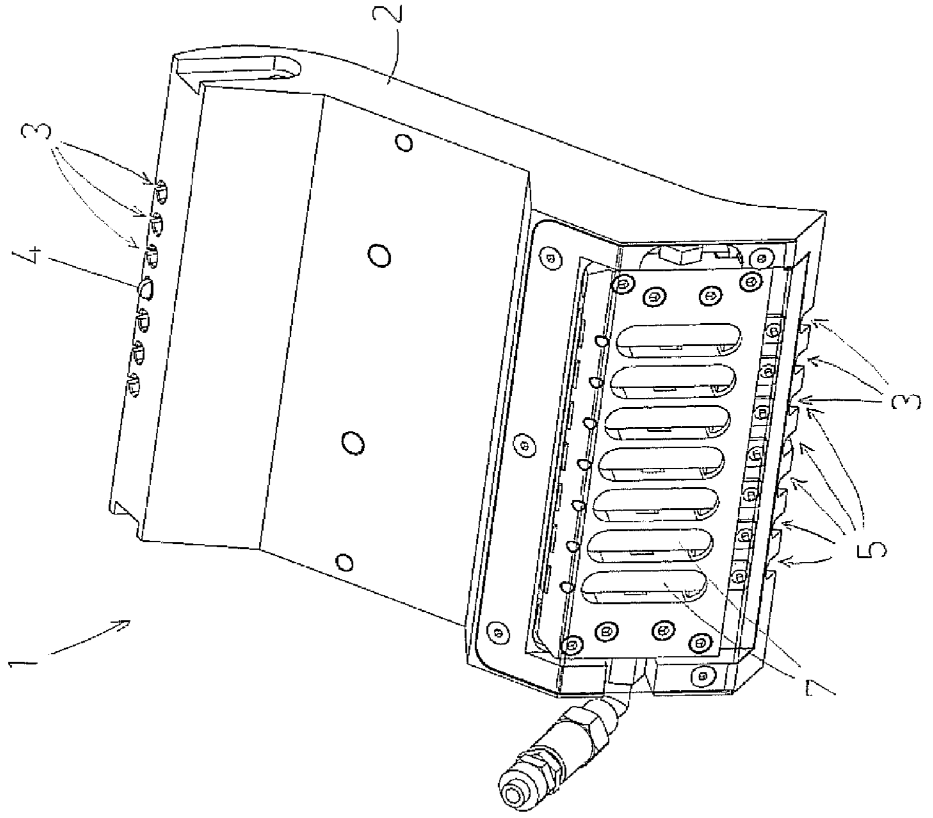
FIGS. 1 and 2 are two different perspective views of the apparatus according to the present invention.
Figure 1:
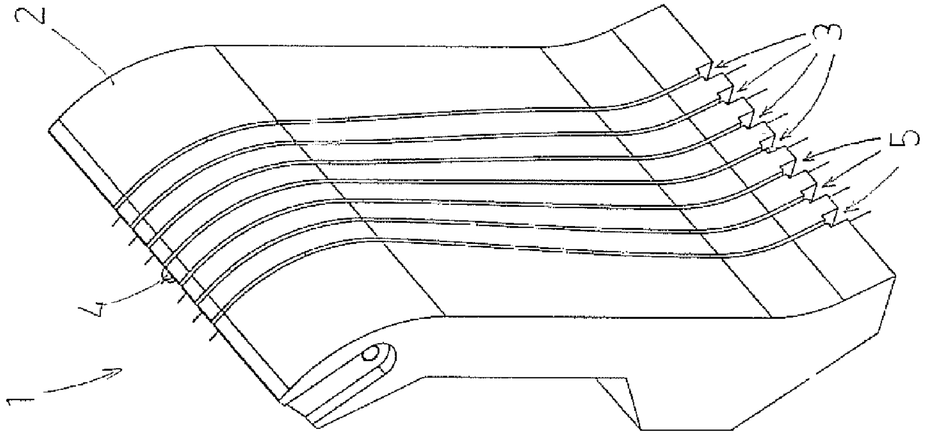

With reference to the accompanying tables of drawings, reference number (1) relates in general to the apparatus that is the object of the present invention, comprising: a frame (2); at least a supply channel (3) which can be crossed by tablets (4) and which comprises an outlet (5) of tablets (4); a tooth (6) which is mobile between a first advanced position (A), in which the tooth (6) blocks the supply channel (3) such as to interrupt transit of tablets (4), and a second retracted position (B) for allowing transit of tablets (4) along the supply channel (3); an elastically flexible blade (7) which is fixed to the frame (2) and equipped with the tooth (6); a tube (8) which can be supplied with a fluid for elastically expanding or retracting the tube (8) in a radial direction as a function of a pressure the fluid attains internally of the tube (8); the tube (8) being arranged so as to abut the flexible blade (7) in such a way that by regulating the pressure of the fluid internally of the tube (8) it is consequently possible to command the position the tooth (6) can take.

The blade (7) is preferably fixed to the frame (2) at a first end (9) of the blade (7). It can be fixed by means of a screw (11). The blade (7) can be parallelepiped in shape.

The tooth (6) is preferably arranged at a second end (10) of the blade (7), opposite the first end (9).

The blade (7) can be made of a metal material, but preferably it is made of a material comprising a fiberglass tissue impregnated with resins.

The tube (8) is preferably made of silicone and can be circular in section. The blade (7) can conform the tooth (6) in a single body.

A source of compressed air (not illustrated) is preferably associated to the apparatus (1) which supplied the tube (8). The fluid flowing in the tube (8) is therefore air. The tube (8) can be closed at an end thereof.

In the embodiment illustrated in the figures, the tube (8) is interposed between the supply channel (3) and the blade (7), such that an expansion in the radial direction of the tube (8) determines the flexing of the blade (7) with a consequent displacement of the tooth (6) towards the second retracted position (B). Consequently, should there be an interruption in the compressed air, for example due to malfunctioning, in the tube (8), the tooth (6) would occupy the first advanced position (A), blocking the transit of tablets (4) along the supply channel (3) and thus preventing the tablets (4) from exiting and falling on the heat-formed strip (19).

The apparatus (1) can comprise a member (12) fixed to the frame (2) which conforms a seating (13) shaped as a half-cylinder so as to partially accommodate the tube (8). In a transversal section, the seating (13) has, for example, an arc of circumference profile having an angle of about 180°.

The tube (8) can be arranged in a transversal direction with respect to the blade (7) and with respect to the supply channel (3). A part of the tube (8) contacts the seating (13) of the member (12), while the opposite side faces the blade (7). In this way, an expansion of the tube (8) can take place only towards the blade (7) and can be more pronounced with respect to the case in which the tube (8) does not contact the seating (13) of the member (12) and that is in the case in which it were free to expand in a radial direction.

As mentioned, the tube (8) can expand or can retract up to taking on, for example, the original shape thereof which it would have in the absence of compressed air or with a compressed-air pressure internally that is lower than a threshold value.

Figure 5:
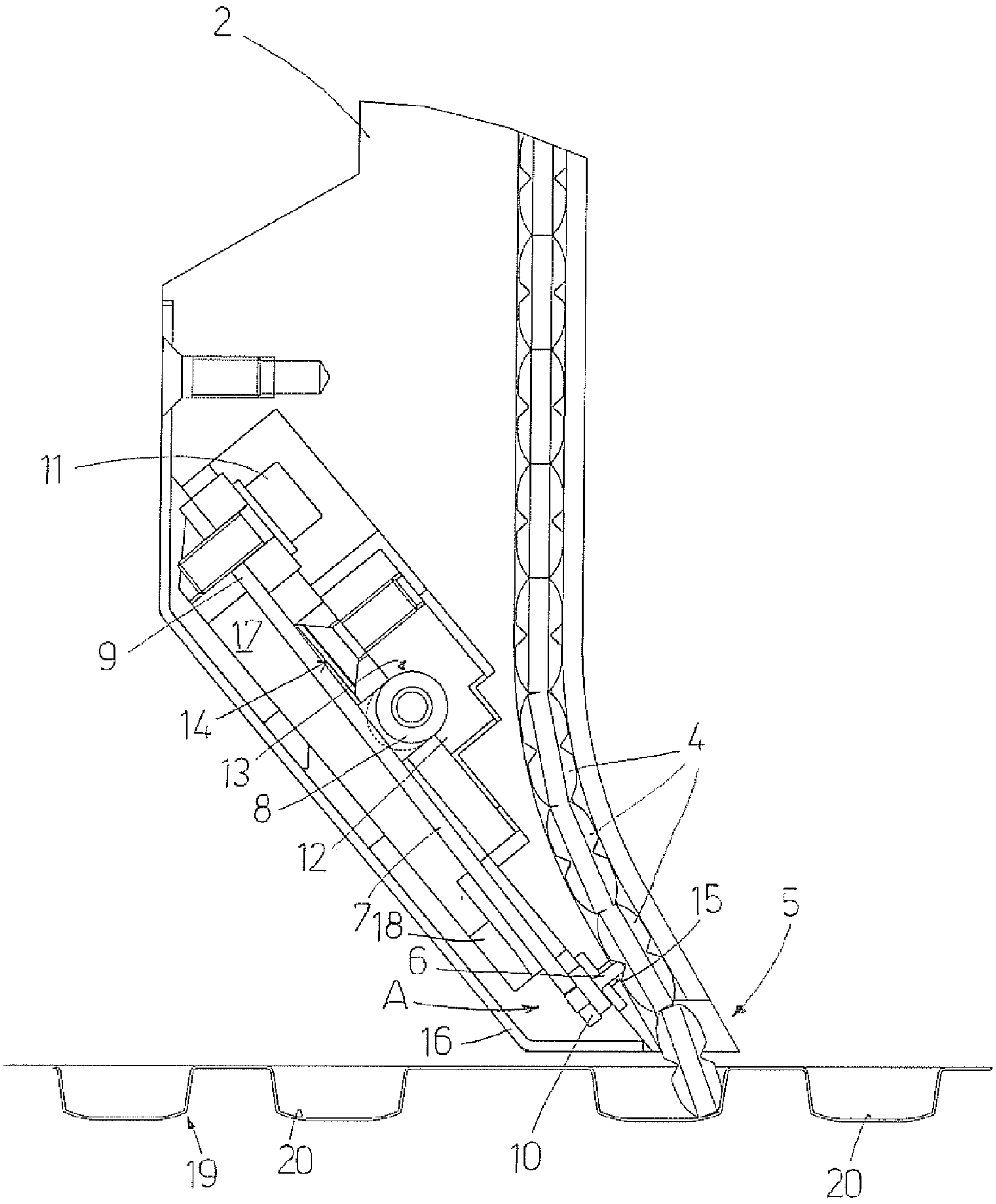

FIG. 5 shows the tube (8) retracted or exhibiting the original shape thereof. The blade (7) contacts a first abutment (14) fixed to the frame (2) and the tooth (6) stably assumes the first advanced position (A). The tube (8) does not contact the blade (7).

The supply channel (3) exhibits a passage (15) in which the tooth (6) slides. The apparatus (1) comprises a lower casing (16) which is fixed to the frame (2) and which forms, together with the frame (2), a chamber (17) in which the blade (7) and the tube (8) are housed. The chamber (17) communicates with the supply channel (3) only thanks to the passage (15).

Figure 4:
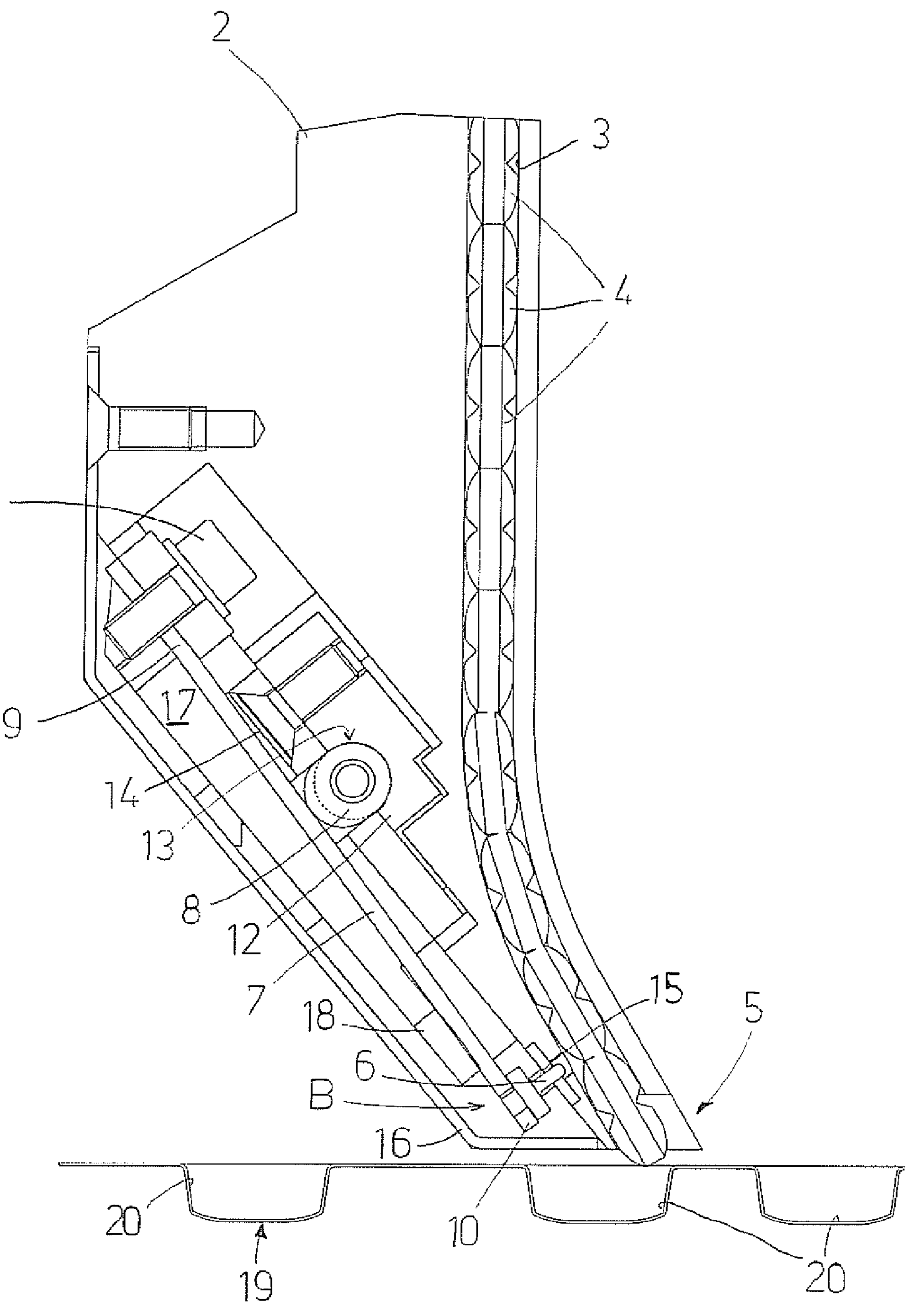
FIGS. 4 and 5 are lateral section views of the apparatus of the invention operating in order to release tablets on an underlying heat-formed strip, in two different functioning steps.

FIG. 4 shows the tube (8) which has expanded by effect of the pressure the air contained internally thereof has reached. The tube (8) contacts the blade (7) which causes a flexion that is such that the tooth (6) moves from the first advanced position (A) to the second retracted position (B). The blade (7) contacts a second abutment (18) fixed to the frame (2). The blade (7), therefore, can have an excursion which is defined by the first abutment (14) and the second abutment (18). However, the blade (7) is preferably constantly deformed and for this reason always exerts a pair that would tend to move the tooth (6) towards the first advanced position (A). Also when the tooth (6) is in the first advanced position (A), the blade (7) exerts a pressure against the first abutment (14).

FIG. 4 shows the tooth (6) in the second retracted position (B). The tablets can transit freely in the supply channel (3) and reaches the relative outlet such as to fall into corresponding cells (20) of an underlying heat-formed strip (19).

FIG. 5 shows the tooth (6) in the first advanced position (A) in which it intercepts a tablet (4) and thus blocks the passage (15) of further tablets (4) along the supply channel (3), towards the outlet (5). The only tablet (4) which has been released will go to occupy a corresponding cell (20).

This type of pneumatic command enables performing high-frequency cycles of work, much greater than what can be achieved with known apparatus.

According to an embodiment not illustrated in the drawings, the blade is interposed between the tube and the supply channel such that an expansion in the radial direction of the tube determines the flexing of the blade with a consequent displacement of the tooth towards the first advanced position. In this case if the fluid is air and if an undesired interruption of the supply of compressed air in the tube were to occur, the tooth would occupy the second retracted position, which would enable transit of tablets through the outlet of the supply channel. The advantage of this embodiment consists in a still greater velocity of intervention of the tooth in the supply channel thanks to the pneumatic command.

Figure 3:
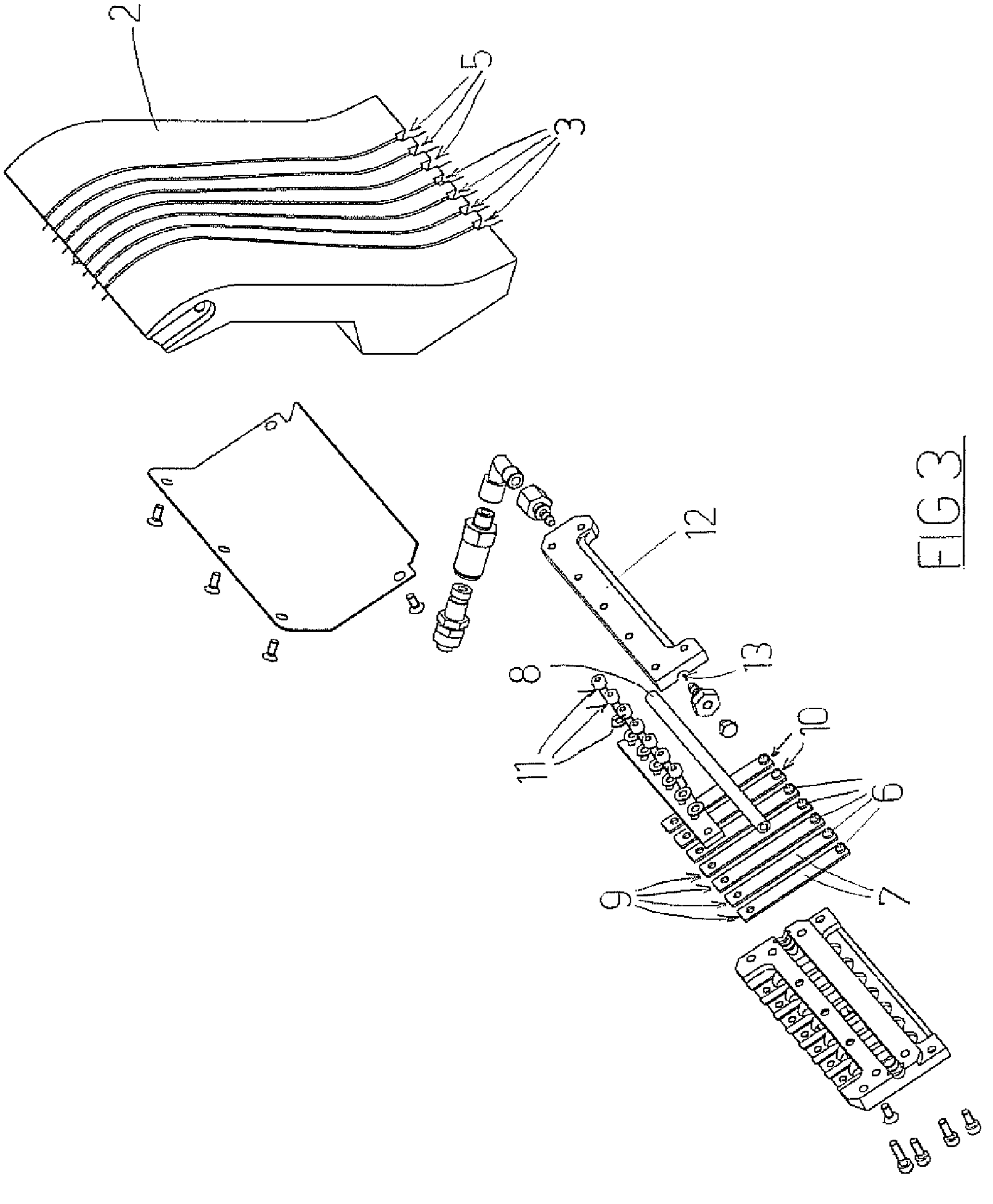
FIG. 3 is a perspective and exploded view of the apparatus of FIGS. 1 and 2.

Taking account of the fact that a heat-formed strip (19) can have several longitudinal rows of cells (20) to be filled with tablets (4), the apparatus (1) of the invention can comprise (see in particular FIG. 3) a plurality of supply channels (3) flanked to one another, a plurality of blades (7) flanked to one another, each blade (7) being provided with a tooth (6) for intervening in a corresponding supply channel (3), the tube (8) being arranged preferably transversally with respect to the plurality of blades such as to abut each blade (7) so that by regulating the pressure of the fluid internally of the tube (8) it is consequently possible to contemporaneously command the position taken on by the teeth (6).

The foregoing has been described by way of non-limiting example, and any eventual constructional variants are understood to fall within the scope of protection of the present technical solution, as claimed in the following.

The invention claimed is:

1. An apparatus for regulating release of tablets into cells of a heat-formed strip, comprising:

a frame;

at least one supply channel which can be crossed by the tablets and which has an outlet for the tablets;

a tooth which is mobile between a first advanced position, in which the tooth blocks the supply channel so as to interrupt transit of tablets, and a second retracted position for permitting transit of the tablets along the supply channel;

an elastically flexible blade fixed to the frame and equipped with the tooth;

a tube supplied with a fluid for elastically expanding or retracting the tube in a radial direction as a function of a pressure the fluid attains internally of the tube;

the tube being arranged so as to abut the flexible blade wherein regulating the pressure of the fluid internally of the tube causes the tube to displace the elastically flexible blade for displacing the tooth carried by the blade between the first advanced position and the second retracted position, thereby controlling the position of the tooth;

wherein the tube is interposed between the supply channel and the blade, such that an expansion of the tube flexes the blade with a consequent displacement of the tooth towards the second retracted position.

2. The apparatus of claim 1, wherein the blade is fixed to the frame at a first end of the blade.

3. The apparatus of claim 2, wherein the tooth is arranged at a second end of the blade.

4. The apparatus of claim 1, wherein the blade is made of a material comprising a fiberglass tissue impregnated with resin.

5. The apparatus of claim 1, wherein the tube is made of silicone.

6. The apparatus of claim 1, wherein the blade and the tooth are formed as a single body.

7. The apparatus of claim 1, wherein an end of the tube is closed.

8. The apparatus of claim 1, further comprising a plurality of supply channels that are flanked to one another, a plurality of blades flanked to one another, each blade being equipped with a tooth for blocking a corresponding supply channel, the tube being arranged transversally with respect to the plurality of blades wherein regulating the pressure of the fluid internally of the tube causes the tube to displace the elastically flexible plurality of blades for displacing the teeth carried by the plurality of blades between the first advanced position and the second retracted position, thereby controlling the position assumed by the teeth.

* * * * *